(12) United States Patent
Sachsenmaier et al.

(10) Patent No.: US 8,678,158 B2
(45) Date of Patent: Mar. 25, 2014

(54) TORQUE TRANSMISSION ARRANGEMENT

(75) Inventors: Helmuth Sachsenmaier, Graz (AT); Hannes Sperker, Graz (AT); Robert Luef, St. Jakob im Walde (AT)

(73) Assignee: Magna Powertrain AG & Co KG, Lannach (AT)

( * ) Notice: Subject to any disclaimer, the term of this patent is extended or adjusted under 35 U.S.C. 154(b) by 279 days.

(21) Appl. No.: 13/147,911

(22) PCT Filed: Jan. 5, 2010

(86) PCT No.: PCT/EP2010/000015
§ 371 (c)(1),
(2), (4) Date: Oct. 19, 2011

(87) PCT Pub. No.: WO2010/089009
PCT Pub. Date: Aug. 12, 2010

(65) Prior Publication Data
US 2012/0024657 A1    Feb. 2, 2012

(30) Foreign Application Priority Data
Feb. 6, 2009 (DE) .......................... 10 2009 007 835

(51) Int. Cl.
*F16D 13/54* (2006.01)
*F16D 13/58* (2006.01)

(52) U.S. Cl.
USPC ................... 192/70.23; 192/93 A; 192/110 B

(58) Field of Classification Search
USPC .......................................... 192/70.23, 70.24
See application file for complete search history.

(56) References Cited

U.S. PATENT DOCUMENTS

| | | | |
|---|---|---|---|
| 4,352,415 A * | 10/1982 | Powell | 192/70.23 |
| 4,976,347 A | 12/1990 | Sakakibara et al. | |
| 5,699,888 A | 12/1997 | Showalter | |
| 5,911,291 A * | 6/1999 | Suetake et al. | 192/35 |
| 6,530,460 B2 * | 3/2003 | Gradu | 192/70.23 |
| 6,691,845 B2 * | 2/2004 | Showalter | 192/93 A |
| 7,357,748 B2 | 4/2008 | Kelley, Jr. | |

FOREIGN PATENT DOCUMENTS

| | | |
|---|---|---|
| AT | 008636 | 10/2006 |
| DE | 102005061268 | 6/2007 |
| DE | 102006025060 | 12/2007 |
| EP | 1854654 | 11/2007 |
| FR | 2674927 | 10/1992 |

* cited by examiner

*Primary Examiner* — Rodney Bonck
(74) *Attorney, Agent, or Firm* — Dickinson, Wright PLLC

(57) ABSTRACT

A torque transmission arrangement including a primary shaft, a friction clutch, a housing in which the primary shaft is rotatably supported by a roller element bearing including an inner ring and an outer ring. An actuator is disposed in the housing between the friction clutch and the roller element bearing for actuating the friction clutch. The actuator comprises a fixed support element, an adjusting element axially offset from the support element and displaceable for engaging the friction clutch, and an actuating mechanism designed for displacing the adjusting element relative to the support element in an axial adjusting direction away from the roller element bearing. The roller element bearing is designed as a tapered roller bearing, and the support element is operationally connected to the tapered roller bearing.

27 Claims, 5 Drawing Sheets

TORQUE TRANSMISSION ARRANGEMENT

CROSS-REFERENCE TO RELATED APPLICATIONS

This application is a National Stage of International Application No. PCT/EP2010/000015, filed Jan. 5, 2010. This application claims the benefit and priority of German Patent Application No. 10 2009 007 835.5, filed Feb. 6, 2009. The entire disclosure of each of the above applications are incorporated herein by reference.

FIELD

The present disclosure relates to a torque transmission arrangement comprising a primary shaft, a friction clutch for the controllable transmission of a torque from the primary shaft to another element, a housing containing the friction clutch, wherein the primary shaft is rotatably supported in the housing by means of a roller element bearing including an inner ring and an outer ring, and an actuator arranged between the friction clutch and the roller element bearing for actuating the friction clutch. The actuator includes a fixed support element, an adjustment element that is arranged axially offset from the support element and is displaceable for engaging the friction clutch, and an actuation mechanism designed for displacing the adjustment element relative to the support element in an axial adjustment device facing away from the roller element bearing.

BACKGROUND

A torque transmission arrangement can, for example, be used as a transfer case in a motor vehicle having all-wheel drive for the controllable transmission of a driving torque to a primary axle and/or a secondary axle of the motor vehicle. In a so-called "torque on demand" transfer case, the wheels of the primary axle are permanently driven, whereas a portion of the driving torque can be selectively transferred to the wheels of the secondary axle by means of the torque transmission arrangement. A transfer case of this kind can also be designed as a controllable center differential in which the friction clutch is associated with a differential lock.

Transfer cases are moreover used in various constellations. They can be designed with or without a center differential, with a differential lock or a connectable drive of the second driven axle, with or without a step-down stage. They are installed in the longitudinal direction as a rule. The use of a friction clutch additionally allows the continuous control of the clutch torque transmitted by it in addition to a gentle clutch engagement.

A transfer case of the above-described kind is disclosed, for example, in AT 008636 U1. In the construction of such transfer cases, there is usually the endeavor to support the relatively high axial forces that occur on the engagement of the friction clutch in a closed power circuit at the primary shaft and not at the housing. A support at the primary shaft is advantageous since it usually has a high material strength as well as small production tolerances. The housing usually comprises aluminum. Furthermore, a closed force circuit can only be realized via the primary shaft because some of the axial forces are necessarily introduced into the primary shaft via the friction clutch. The support element must, therefore, be supported at the primary shaft in the axial direction. Since the support element is, however, held secure against rotation in the housing, whereas the primary shaft rotates during operation, the support force must be transmitted via a suitable moving support from the support element to the primary shaft. In AT 008636 U1, the support element is, therefore, supported at the primary shaft via an additional axial roller element bearing, a sliding ring as well as a transmission element rotationally fixedly connected to the primary shaft. Such an arrangement is, however, associated with a relatively high effort and correspondingly increased costs.

SUMMARY

The present disclosure provides a torque transmission arrangement that can be constructed and produced more simply and less expensively.

The torque transmission arrangement according to the present disclosure includes a roller element bearing that is designed as a tapered roller bearing. The support element is in operative connection with the tapered roller bearing.

It was recognized that the force flow from the fixed support element to the rotating primary shaft can be realized particularly simply when a roller element bearing is included in the support of the support element, with the primary shaft being supported in the housing by the roller element bearing. Because the roller element bearing is designed as a tapered roller bearing, it is also able to take up axial forces in one direction in addition to radial forces. Due to the operative connection between the support element and the tapered roller bearing, the axially acting clutch engagement force can thus be transmitted from the support element to the primary shaft without any complex and/or expensive additional components. The relatively complex arrangement of primary shaft bearing, transmission element, sliding ring and additional axial roller element bearing is thus replaced with a single component. The design and the manufacture of a generic torque transmission arrangement is accordingly made substantially more simple.

The support element can in particular be supported against the adjustment direction at the outer ring of the tapered roller bearing. Such a support can take place, in dependence on the embodiment, over the entire periphery of the outer ring or segment-wise in selected regions. Direct contact between the support element and the outer ring can, for example, make all further additional components superfluous. Provided that the respective application requires it, however, coupling components such as contact pressure disks or the like can also be arranged between the support element and the outer ring of the tapered roller bearing.

The tapered roller bearing is preferably not supported at the housing in the axial direction to avoid unwanted transmission of axial forces to the housing for the above-mentioned reasons. Since as a rule the friction clutch is in turn supported at the primary shaft in the adjustment direction, a closed force circuit is thus generated overall via the primary shaft. A radial support of the tapered roller bearing can take place via an intermediate element, for example a sliding ring, in the housing. It is possible in this manner to compensate a different thermal expansion of the individual components or any clearance that may be present.

The inner ring of the tapered roller bearing can be supported against the adjustment direction at the primary shaft to direct any axial forces directed against the adjustment direction away via the primary shaft. The support can take place by different measures, such as by an abutment fastened to the primary shaft or made in one piece therewith. A direct support on the shaft or a support via a suitable intermediate piece, for example a flange, can be provided.

The tapered ball bearing can be supported in the housing such that at least one section of the peripheral surface of the outer ring of the tapered roller bearing facing the friction clutch is exposed. That is, it is not surrounded by housing parts. The exposed section can provide a favorable engagement surface for the support element, with a transmission of axial forces onto the housing being reliably avoided.

The support element can be designed as a support ring arranged concentrically about the primary shaft. Alternatively or additionally, the adjustment element can be designed as an adjustment ring arranged concentrically about the primary shaft. Such rings allow a uniform force distribution and avoid disadvantageous asymmetrical loads on the tapered roller bearing and on the primary shaft.

The tapered roller bearing can advantageously be used for centering the support ring. The above-described exposed section of the outer ring can be used for this purpose. Since the tapered roller bearing is centered on the primary shaft, complex and/or costly separate centering apparatus or a complex and/or costly special reworking of the support ring are thus omitted. The centering can take place over the entire periphery of the outer ring, or over individual centering elements.

The support ring can, for example, have a centering nose that is peripheral on the end face of the support ring facing the tapered roller bearing, and that is in engagement with the outer ring of the tapered ball bearing and thus provides a concentric arrangement of the support ring and of the tapered roller bearing. This is advantageous in that a centering of the support ring in the housing becomes superfluous and neither the peripheral surface of the support ring nor the corresponding counter-surface in the housing has to be produced with the increased precision required for a centering effect. Instead of a peripheral centering nose, the arrangement of a plurality of centering noses arranged only regionally is possible.

The support ring can have at least one nose-like projection on its peripheral surface that is in engagement with a corresponding recess in a bearing section of the housing. A security against rotation of the support ring with respect to the housing can thereby be provided in a simple manner.

The support ring can be supported in the axial direction at the outer ring of the tapered roller bearing. At least one axial support nose can be provided at the support ring for the axial support of the support ring at the outer ring. The axial support nose acts in an axial direction as an abutment toward the outer ring of the tapered roller bearing and fixes the support ring in the housing in this direction.

The support ring can be supported and centered on the outer ring of the tapered roller bearing in the radial direction. The support ring can, therefore, be fixedly supported in the housing both in the axial direction and in the radial direction by the tapered roller bearing. In this manner, the support of the support ring can be largely decoupled from the housing, whereby problems due to different thermal expansions of the housing and of the support ring can be avoided.

At least one radial support nose can be provided at the support ring for the radial support of the support ring on the outer ring. The radial support nose can have a centering shoulder that engages over the outer ring of the tapered roller bearing. In this manner, a reliable centering of the support ring at the tapered roller bearing is achieved.

Furthermore, at least one fixing nose can be provided at the support ring for the securing of the support ring against rotation with respect to the housing. The fixing nose can cooperate with a component of the housing to prevent a rotational movement of the support ring. Such a fixing nose can easily be integrated into the support ring and makes complex and/or expensive additional components for security against rotation superfluous.

The support ring can have one or more, in particular, three, noses projecting in the axial direction at an end face. The nose or noses can be designed as a radial support nose, as an axial support nose, as a fixing nose, or any combination thereof. The nose or noses can, in particular, be made in one piece with the support ring to support the support ring in the axial and radial directions at the outer ring of the tapered roller bearing and simultaneously to secure it against rotation. It is not necessary in this case to provide a peripheral centering nose at an end face of the support ring. The support ring itself also does not have to be surrounded by the housing. It is sufficient that only the nose or noses be in contact with a housing section.

In accordance with an aspect, the nose or noses need not project in the radial direction beyond the radially inner surface, the radially outer peripheral surface, or both, of the support ring. This facilitates the manufacture of the support ring since the peripheral surfaces can be produced by means of lathing.

The housing can include a bearing section for the outer ring of the tapered roller bearing, with one or more recesses being provided in the bearing section into which the nose or noses engage(s). The support ring is secured against any rotation due to the engagement of the nose or noses into the recesses without a separate apparatus being required. It is not necessary to provide projections, arms, or levers at the peripheral surface of the support ring so that it can be manufactured more simply. One or more of the recesses can additionally be utilized as a lubrication passage. Conversely, passages or cut-outs present in the housing can also be used for receiving a respective nose.

The bearing section can cover the peripheral surface of the outer ring of the tapered roller bearing only regionally in the axial direction, in the peripheral direction, or both. The covered regions can in particular be completely covered by the bearing section when regions of the peripheral surface are present which are not covered in the peripheral direction. A stable seat of the outer ring of the tapered roller bearing in the housing is thereby achieved.

The actuator can be designed as a ramp ring mechanism that generates an axial displacement of the adjustment ring on a rotation of the adjustment ring relative to the support ring. The principles of the present disclosure can, however, be applied to different kinds of actuator configurations.

DRAWINGS

The drawings described herein are for illustrative purposes only of selected embodiments and not all possible implementations, and are not intended to limit the scope of the present disclosure.

DETAILED DESCRIPTION

Figure 1:
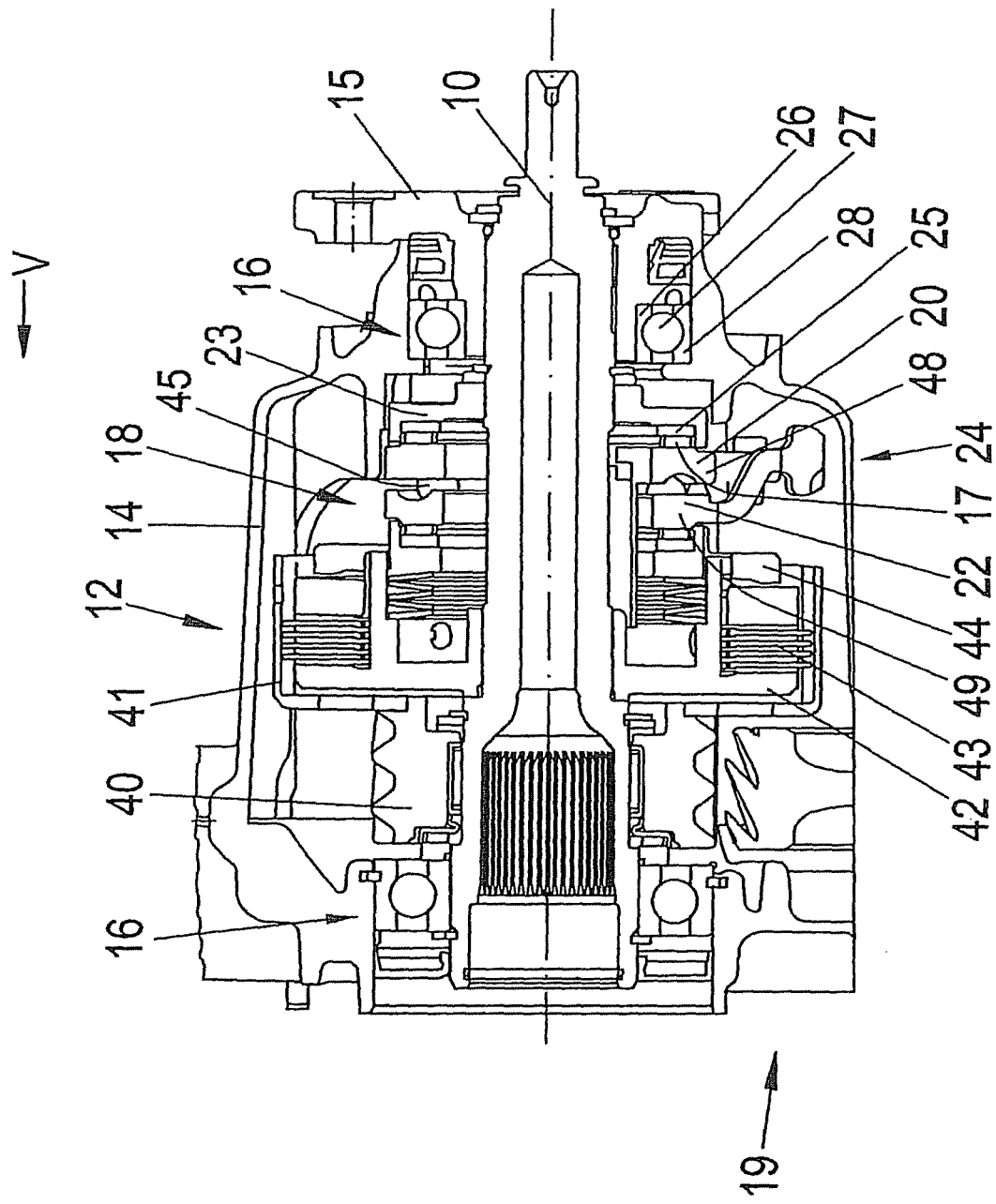
FIG. 1 shows a partial longitudinal sectional view of a transfer case in accordance with the prior art.

The housing of a transfer case in accordance with the prior art is designated in total by 14 in FIG. 1. It includes a primary shaft 10, a secondary shaft (not shown) and a friction clutch 12 with its actuator 18. The primary shaft 10 is connected at the left hand drawing side to a drive source, for instance to the manual transmission of a motor vehicle, which is not shown, and is connected on the right hand side of the drawing via a flange 15 to a first driven axle, not shown. The friction clutch 12 enables a controlled transmission of a torque from the primary shaft 10 via an offset drive 19, only shown in part, to the secondary shaft. Instead of the offset drive 19 and the secondary shaft, other elements can also be provided for receiving the torque transmitted by the friction clutch 12.

The friction clutch 12 is here a multi-disk clutch whose inner part 42 is rotationally fixedly connected to the primary shaft 10 and whose outer part 41 is rotationally fixedly connected to the first toothed wheel 40 of the offset drive 19. A disk package 43 is located between the two clutch parts 41, 42 and its disks are alternately rotationally fixedly connected to the one (41) or the other (42) clutch part. A pressure plate 44, which can be acted on by a ramp ring unit, adjoins the disk package 43.

The ramp ring unit includes a support element 20 and an adjustment element 22. The support element 20 in the variant shown is formed by a first ramp ring or support ring 48, on the side at the right in FIG. 1, whereas the adjustment element 22 is formed by a second ramp ring or adjustment ring 49, on the side at the left in FIG. 1. Balls 45 are distributed over the periphery between the support ring 48 and the adjustment ring 49. In the example shown, the balls 45 cooperate with channels rising in the peripheral direction, which are not shown in detail, such that the rotation of the two ramp rings 48, 49 in the opposite sense drives them apart from one another in the axial direction. Different construction types are, however, also possible.

To be able to introduce axial forces which occur on the actuation of the friction clutch 12 into the primary shaft 10, the support ring 48 is supported via an axial needle bearing 17 at a sliding ring 25 which is in turn supported at the primary shaft 10 via a support sleeve 23 rotationally fixedly and axially fixedly connected to the primary shaft 10.

The primary shaft 10 is supported at the housing 14 of the transfer case by means of two roller element bearings 16 and is sealed in a customary manner. The roller element bearings 16 are designed as radial ball bearings and include an inner ring 26, an outer ring 28 as well as a set of balls 27 which are arranged therebetween and which can be held by a ball cage, not shown. As can be recognized, the roller element bearings 16 are not in any connection with the ramp ring mechanism.

Figure 2:
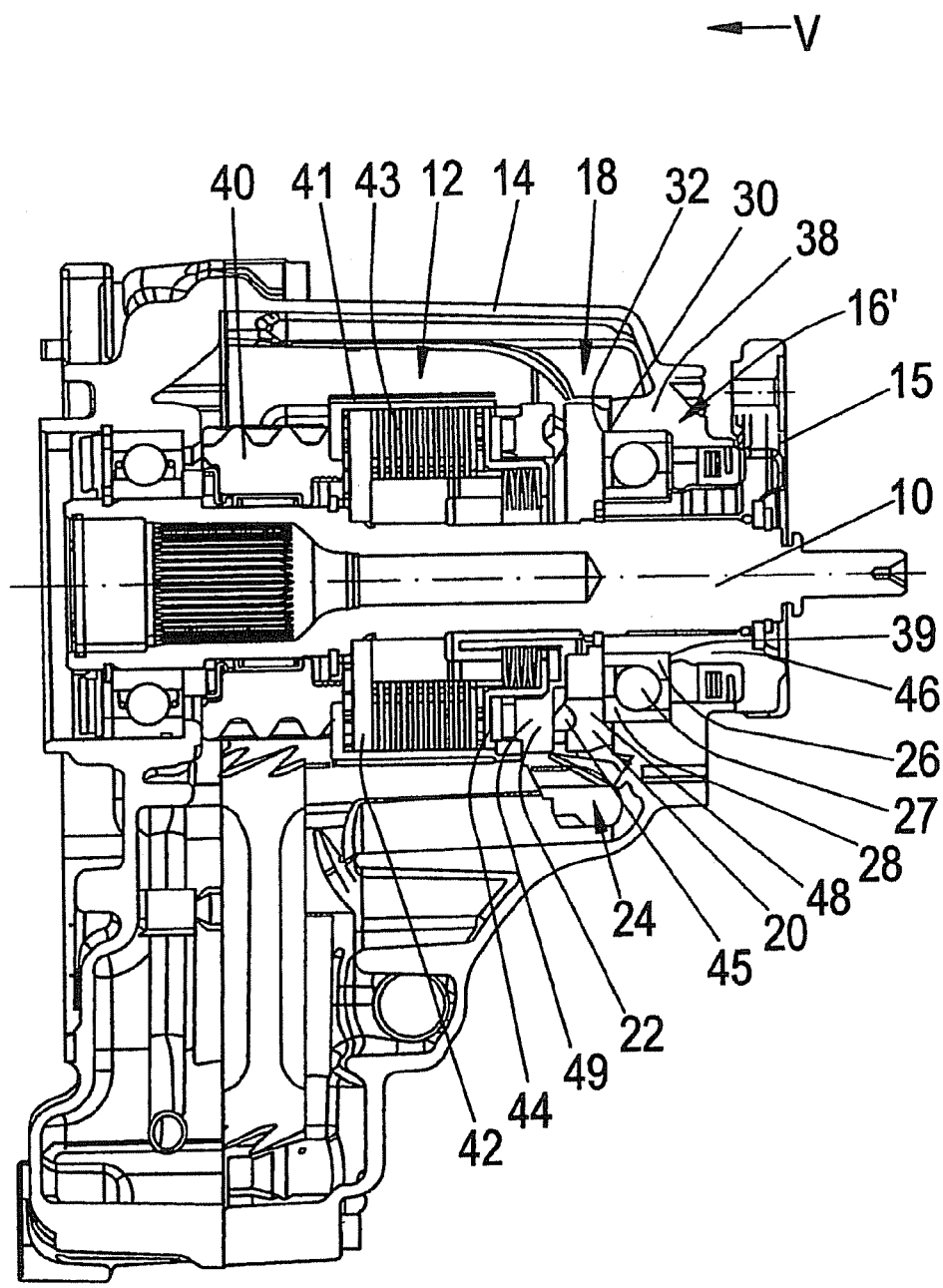
FIG. 2 shows a longitudinal sectional view of a transfer case in accordance with the invention.

FIG. 2 shows a sectional view of a transfer case in accordance with the present disclosure which has a similar structure to the transfer case in accordance with FIG. 1. As can be recognized, the roller element bearing 16' disposed at the right in the Figure is here, however, made as a tapered roller bearing and is thus able to receive both axial and radial forces. In accordance with the representation, the roller element bearing 16' is supported in the housing 14 so that an axial force reception against the adjustment direction V of the adjustment ring 49 is made possible.

As is shown, the tapered roller bearing 16' is supported by means of its outer ring 28 radially in a bearing section 38 of the housing 14, with a section 30 of the peripheral surface of the outer ring 28 facing the friction clutch 12 being exposed. The inner ring 26 of the tapered roller bearing 16' is seated on a sleeve-shaped extension 46 of the flange 15 rotationally fixedly connected to the primary shaft 10 and is supported via an abutment 39 against the adjustment direction V at the primary shaft 10.

The end face of the support ring 48 facing away from the friction clutch 12 directly abuts the outer ring 28 of the tapered roller bearing 16'. There is therefore a direct mechanical operative connection between the support ring 48 and the tapered roller bearing 16' so that the support ring 48 is supported at the outer ring 28 of the tapered roller bearing 16' against the adjustment direction V of the adjustment ring 49. The tapered roller bearing 16' is, in contrast, not supported in the axial direction at the housing 14 so that an axial force acting on the outer ring 28 against the adjustment direction V is transmitted via the balls 27 radially onto the inner ring 26 and thus on the primary shaft 10. The force flow on the engagement of the friction clutch 12 therefore does not take place as in the arrangement in accordance with FIG. 1 via needle bearings 17 with a sliding ring 25 provided especially for this purpose as well as a support sleeve 23 additionally rotationally fixedly attached to the primary shaft 10, but rather directly from the support ring 48 via the tapered roller bearing 16' onto the primary shaft 10. The roller element bearing 16' of the primary shaft 10 anyway to be provided is therefore advantageously used to support the ramp ring mechanism against the engagement direction so that the additional components for support force transmission become superfluous. The total transfer case can thereby in particular also be designed in a more space saving manner since separate installation space for the support sleeve 23, the needle bearing 17, the sliding ring 25 or similar elements does not have to be provided in the axial direction.

The support ring 48 has a concentric incision at its end face facing the tapered roller bearing 16' so that the region of the support ring 48 radially adjoining it forms a peripheral centering nose 32 which, as shown, is in engagement with the peripheral surface of the outer ring 28 of the tapered roller bearing 16'. A centering of the support ring 48 is hereby achieved at the tapered roller bearing 16' and thus at the primary shaft 10.

At its peripheral side, the support ring 48 has at least one nose-like projection (not shown in the drawings) which is in engagement with a recess (likewise not shown) in the bearing section 38 of the housing 14 to support the support ring 48 securely against rotation in the housing 14. Such an arrangement reliably prevents an unwanted rotation of the support ring which could impair an exact control of the torque transmission. Since a peripheral surface provided with a projection generally cannot be produced by means of lathes, it is of particular advantage that the centering of the support ring 48 with respect to the primary shaft 10 does not take place at the housing 14 or at the bearing section 38, but rather at the tapered roller bearing 16' itself. No excessively high demands are thus made on the peripheral surface of the support ring 48 with respect to the surface quality and the dimensional tolerances, whereas the centering nose 32 in turn has to be produced in a simple manner by lathing since it is rotationally symmetrical and does not have any projections or indents.

Figure 3:
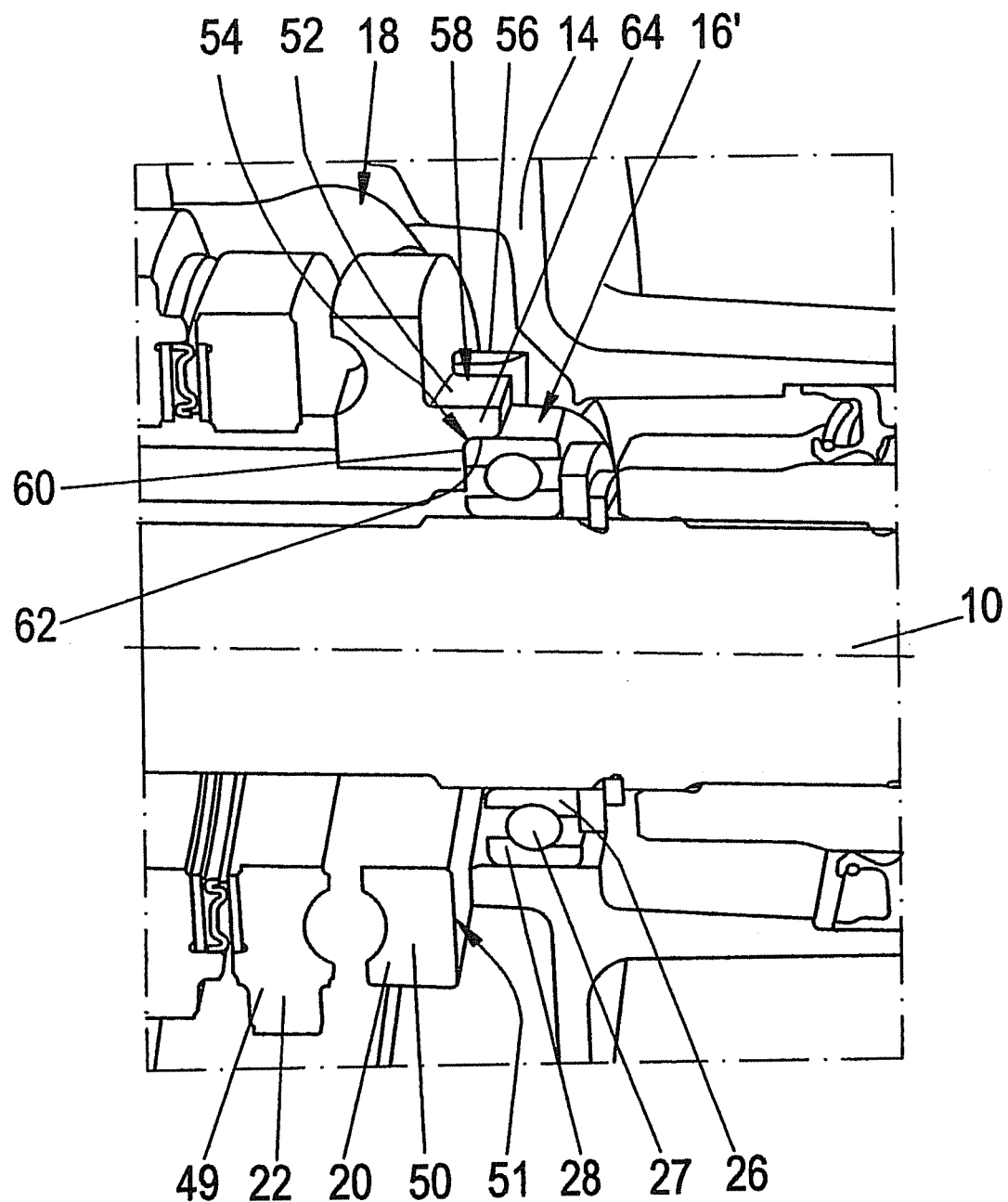
FIG. 3 shows an enlarged partial longitudinal view of a transfer case in accordance with an alternative embodiment of the invention.
Figure 4:
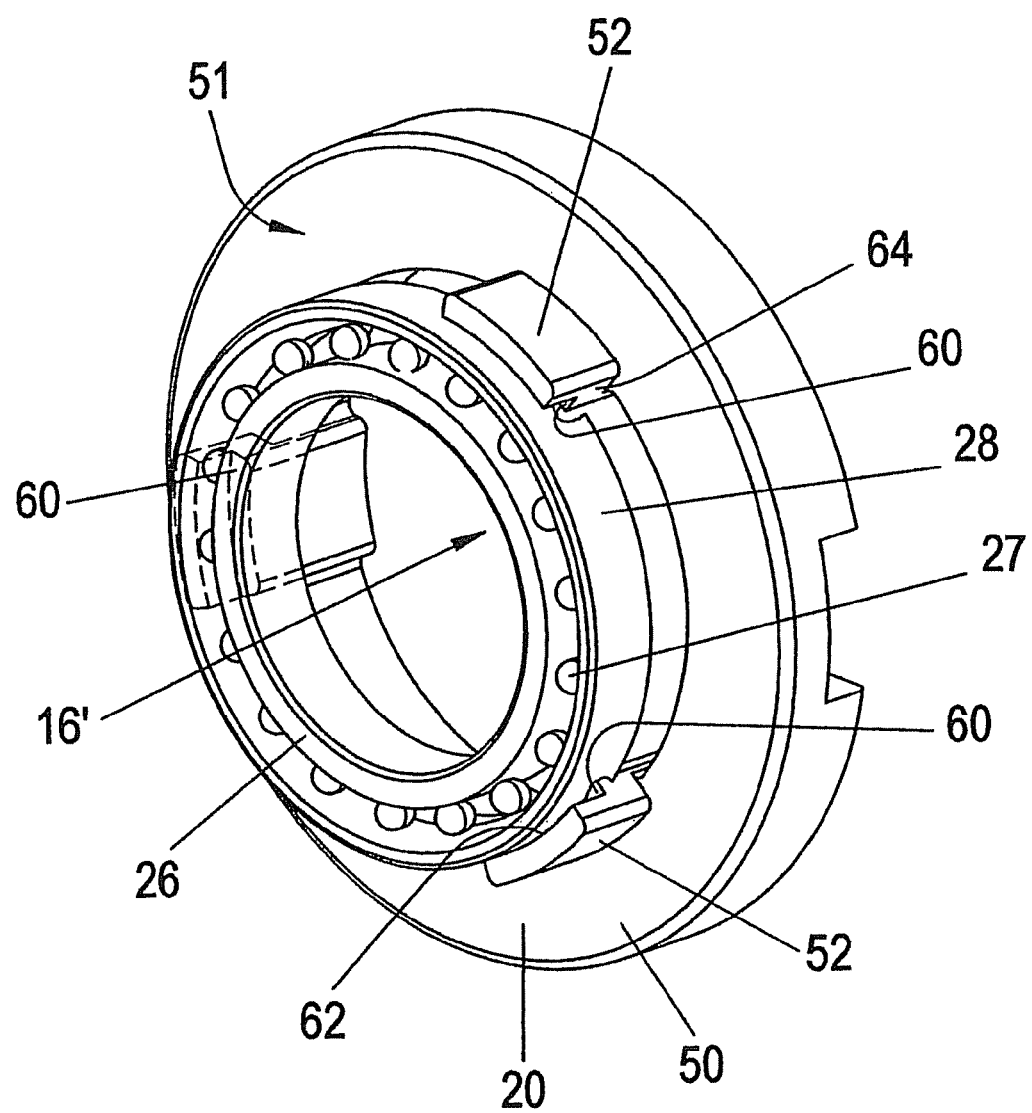
FIG. 4 shows a perspective representation of a support ring for an actuator of the transfer case of FIG. 3.
Figure 5:
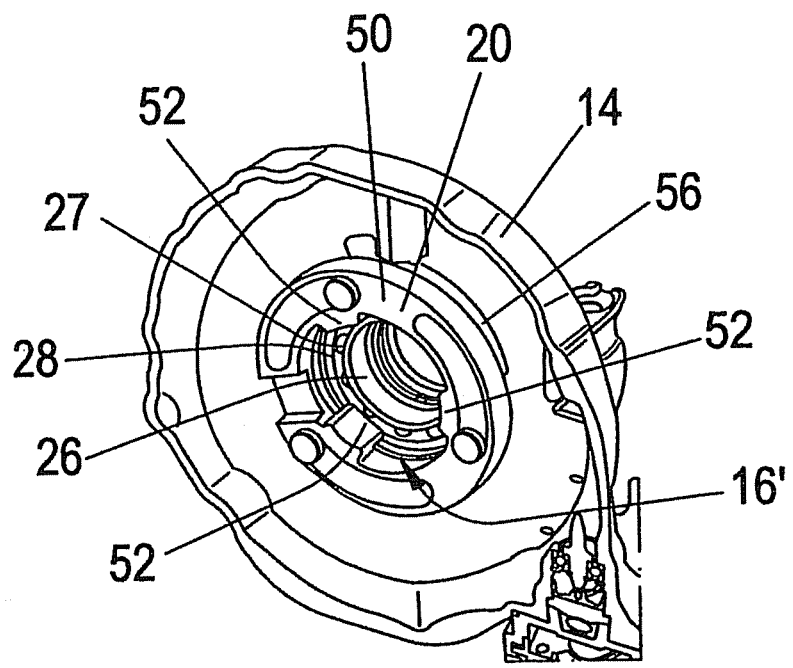
FIG. 5 shows a perspective representation of the housing of the transfer case of FIG. 3.
Figure 5:
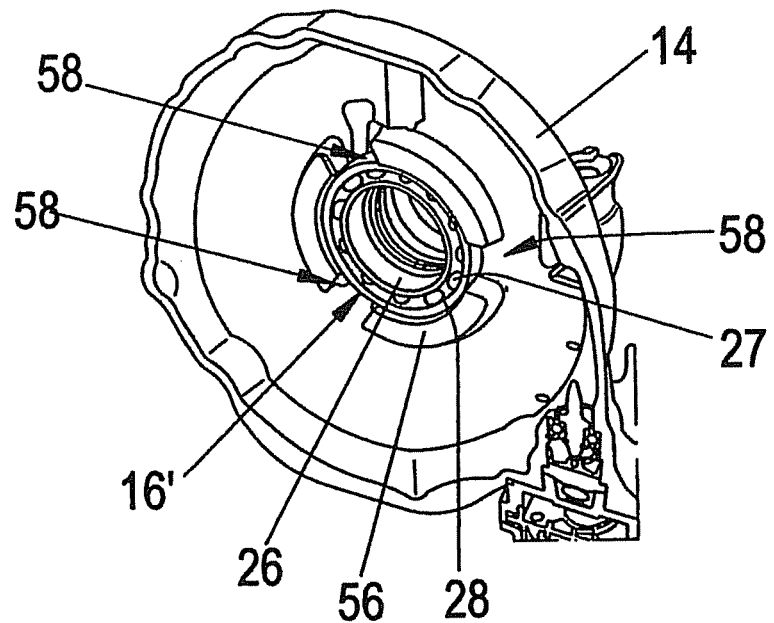

An alternative embodiment will be described in the following with reference to FIGS. 3 and 5. Components which are the same or equivalent are designated by the same reference numerals as in FIG. 2. The support element 20 is here made as a support ring 50 having three noses 52 projecting in the axial direction from an end face 51. Each of the noses 52 is equipped with a centering shoulder 54 which engages over the outer ring 28 of the tapered roller bearing 16'. The two flanks of the centering shoulder 54 form an axial support nose 60 and a radial support nose 62. The support ring 50 is thus supported at the tapered roller bearing 16' both in the axial direction and in the radial direction.

Since no peripheral centering nose is present, but rather a plurality of mutually separate nose regions, the possibility results of providing an engagement between the noses 52 and a bearing section 56 of the housing 14 to secure the support ring 50 against rotation. For this purpose, as can in particular be seen from FIG. 5, the bearing section 56 extending about the outer ring 28 of the tapered roller bearing 16' is made interrupted so that three recesses 58 are present. The recesses 58 are dimensioned and in particular have the same extent in the peripheral direction as the noses 52 such that they each provide a seat for the noses 52 which thus form a fixing nose 64 in every direction of rotation.

In accordance with this embodiment, the support ring 50 is thus supported by one and the same noses 52 not only axially and radially at the outer ring 28 of the tapered roller bearing 16', but rather also in the direction of rotation in the housing 14. It must be noted in this respect that the noses 52 are only supported at the fixing noses 64 in the direction of rotation at the walls of the recesses 58, but not in the axial and radial directions since here a force transmission to the housing 14 should be avoided.

Instead of the three noses 52 shown, a different number of noses 52 can also be provided, preferably at equal intervals, along the periphery of the support ring 50.

The tapered roller bearings 16' and the support ring 50 are preferably made as sintered parts with similar or the same thermal coefficients of expansion to avoid problems due to different thermal expansion during the operation of the transfer case.

A transfer case can thus be produced substantially more simply, more inexpensively and in a more space saving manner than the transfer case of the prior art shown in FIG. 1.

What is claimed is:

1. A torque transmission arrangement comprising:
   a primary shaft;
   a friction clutch for the controllable transmission of a torque from the primary shaft to another element;
   a housing which includes the friction clutch, the primary shaft being rotatably supported in the housing by a roller element bearing that includes an inner ring and an outer ring; and
   an actuator arranged between the friction clutch and the roller element bearing in the housing for actuating the friction clutch, the actuator including:
   a fixed support element;
   an adjustment element arranged axially offset from the support element and being displaceable for engaging the friction clutch; and
   an actuating mechanism for displacing the adjustment element relative to the support element in an axial adjustment direction facing away from the roller element bearing,
   wherein the roller element bearing is made as a tapered roller bearing; and
   wherein the support element is in operative connection with the tapered roller bearing such that the support element is supported against the adjustment direction at the outer ring of the tapered roller bearing.

2. The torque transmission arrangement in accordance with claim 1, wherein the tapered roller bearing is not supported at the housing in an axial direction.

3. The torque transmission arrangement in accordance with claim 1, wherein the inner ring of the tapered roller bearing is supported at the primary shaft against the adjustment direction.

4. The torque transmission arrangement in accordance claim 1, wherein the tapered roller bearing is supported in the housing such that at least one section of a peripheral surface of the outer ring of the tapered roller bearing facing the friction clutch is exposed.

5. The torque transmission arrangement in accordance with claim 1, wherein the support element is made as a support ring and the adjustment element is made as an adjustment ring, at least one of the support element and the adjustment element being arranged concentrically about the primary shaft.

6. The torque transmission arrangement in accordance with claim 5, wherein an outer portion of the support ring is centered at the tapered roller bearing.

7. The torque transmission arrangement in accordance with claim 6, wherein the support ring has at its end face facing the tapered roller bearing a peripheral centering nose that is in engagement with the outer ring of the tapered roller bearing.

8. The torque transmission arrangement in accordance with claim 5, wherein the support ring has at least one nose-like projection on its peripheral surface that is in engagement with a corresponding recess in a bearing section of the housing to support the support ring with rotational security in the housing.

9. The torque transmission arrangement in accordance claim 5, wherein the support ring is supported at the outer ring of the tapered roller bearing in an axial direction.

10. The torque transmission arrangement in accordance with claim 9, wherein at least one axial support nose is provided at the support ring for axial support of the support ring at the outer ring.

11. The torque transmission arrangement in accordance claim 5, wherein the support ring is supported in a radial direction.

12. The torque transmission arrangement in accordance with claim 11, wherein the support ring is centered at the outer ring of the tapered roller bearing in the radial direction.

13. The torque transmission arrangement in accordance with claim 11, wherein at least one axial support nose is provided at the support ring for axial support of the support ring at the outer ring.

14. The torque transmission arrangement in accordance with claim 13, wherein the radial support nose has a centering shoulder that engages over the outer ring of the tapered roller bearing.

15. The torque transmission arrangement in accordance with claim 5, wherein at least one fixing nose is provided at the support ring for securing the support ring against rotation with respect to the housing.

16. The torque transmission arrangement in accordance with claim 5, wherein the support ring has one or more noses projecting in an axial direction at an end face.

17. The torque transmission arrangement in accordance with claim 16, wherein the support ring has three noses projecting in the axial direction.

18. The torque transmission arrangement in accordance with claim 16, wherein the one or more noses are made as at least one of radial support noses, axial support noses, and fixing noses.

19. The torque transmission arrangement in accordance with claim 16, wherein the one or more noses project over the peripheral surface of the support ring in the radial direction.

20. The torque transmission arrangement in accordance with claim 16, wherein the housing includes a bearing section for the outer ring of the tapered roller bearing, with one or more recesses being provided in the bearing section into which the one or mores noses engage.

21. The torque transmission arrangement in accordance with claim 20, wherein the bearing section partially covers the peripheral surface of the outer ring of the tapered roller bearing in at least one of the axial direction and the peripheral direction.

22. The torque transmission arrangement in accordance with claim 5, wherein the actuator is made as a ramp ring mechanism that produces an axial displacement of the adjustment ring on a rotation of the adjustment ring relative to the support ring.

23. A torque transmission arrangement comprising:
a primary shaft;
a friction clutch for the controllable transmission of a torque from the primary shaft to another element;
a housing which includes the friction clutch, the primary shaft being rotatably supported in the housing by a tapered roller bearing that includes an inner ring and an outer ring; and
an actuator arranged between the friction clutch and the tapered roller bearing in the housing for actuating the friction clutch, the actuator including:
a fixed support element in operative connection with the tapered roller bearing;
an adjustment element arranged axially offset from the support element and being displaceable for engaging the friction clutch; and
an actuating mechanism for displacing the adjustment element relative to the support element in an axial adjustment direction facing away from the tapered roller bearing,
wherein the tapered roller bearing is not supported at the housing in an axial direction.

24. A torque transmission arrangement comprising:
a primary shaft;
a friction clutch for the controllable transmission of a torque from the primary shaft to another element;
a housing which includes the friction clutch, the primary shaft being rotatably supported in the housing by a tapered roller bearing that includes an inner ring and an outer ring; and
an actuator arranged between the friction clutch and the tapered roller bearing in the housing for actuating the friction clutch, the actuator including:
a fixed support element in operative connection with the tapered roller bearing;
an adjustment element arranged axially offset from the support element and being displaceable for engaging the friction clutch; and
an actuating mechanism for displacing the adjustment element relative to the support element in an axial adjustment direction facing away from the tapered roller bearing,
wherein the tapered roller bearing is supported in the housing such that at least one section of a peripheral surface of the outer ring of the tapered roller bearing facing the friction clutch is exposed.

25. A torque transmission arrangement comprising:
a primary shaft;
a friction clutch for the controllable transmission of a torque from the primary shaft to another element;
a housing which includes the friction clutch, the primary shaft being rotatably supported in the housing by a tapered roller bearing that includes an inner ring and an outer ring; and
an actuator arranged between the friction clutch and the tapered roller bearing in the housing for actuating the friction clutch, the actuator including:
a fixed support ring in operative connection with the tapered roller bearing;
an adjustment ring arranged axially offset from the support ring and being displaceable for engaging the friction clutch; and
an actuating mechanism for displacing the adjustment ring relative to the support ring in an axial adjustment direction facing away from the tapered roller bearing,
wherein at least one of the support ring and the adjustment ring is arranged to concentrically surround the primary shaft, and
wherein the support ring has at least one nose-like projection on its peripheral surface that is in engagement with a corresponding recess in a bearing section of the housing to non-rotatably support the support ring in the housing.

26. A torque transmission arrangement comprising:
a primary shaft;
a friction clutch for the controllable transmission of a torque from the primary shaft to another element;
a housing which includes the friction clutch, the primary shaft being rotatably supported in the housing by a tapered roller bearing that includes an inner ring and an outer ring; and
an actuator arranged between the friction clutch and the tapered roller bearing in the housing for actuating the friction clutch, the actuator including:
a fixed support ring in operative connection with the tapered roller bearing;
an adjustment ring arranged axially offset from the support ring and being displaceable for engaging the friction clutch, and
an actuating mechanism for displacing the adjustment ring relative to the support ring in an axial adjustment direction facing away from the tapered roller bearing,
wherein at least one of the support ring and the adjustment ring is arranged to concentrically surround the primary shaft; and
wherein the support ring is supported at the outer ring of the tapered roller bearing in an axial direction.

27. A torque transmission arrangement comprising:
a primary shaft;
a friction clutch for the controllable transmission of a torque from the primary shaft to another element;
a housing which includes the friction clutch, the primary shaft being rotatably supported in the housing by a tapered roller bearing that includes an inner ring and an outer ring; and
an actuator arranged between the friction clutch and the tapered roller bearing in the housing for actuating the friction clutch, the actuator including:
a fixed support ring in operative connection with the tapered roller bearing;
an adjustment ring arranged axially offset from the support ring and being displaceable for engaging the friction clutch, wherein at least one of the support ring and the adjustment ring is arranged to concentrically surround the primary shaft; and
an actuating mechanism for displacing the adjustment ring relative to the support ring in an axial adjustment direction facing away from the tapered roller bearing,
wherein the support ring includes at least one fixing nose for securing the support ring against rotation relative to the housing.

* * * * *